US009584878B2

(12) United States Patent
Lu (10) Patent No.: US 9,584,878 B2
(45) Date of Patent: Feb. 28, 2017

(54) METHOD AND SYSTEM FOR COLLECTING, TRANSMITTING, EDITING AND INTEGRATING, BROADCASTING, AND RECEIVING SIGNAL

(76) Inventor: Yong Lu, Beijing (CN)

( * ) Notice: Subject to any disclaimer, the term of this patent is extended or adjusted under 35 U.S.C. 154(b) by 338 days.

(21) Appl. No.: 13/995,570

(22) PCT Filed: Oct. 20, 2011

(86) PCT No.: PCT/CN2011/081023
§ 371 (c)(1),
(2), (4) Date: Jun. 19, 2013

(87) PCT Pub. No.: WO2012/092790
PCT Pub. Date: Jul. 12, 2012

(65) Prior Publication Data
US 2013/0272680 A1    Oct. 17, 2013

(30) Foreign Application Priority Data

Jan. 7, 2011  (CN) .......................... 2011 1 0002782

(51) Int. Cl.
*H04N 5/93*     (2006.01)
*H04N 5/77*     (2006.01)
(Continued)

(52) U.S. Cl.
CPC ....... *H04N 21/854* (2013.01); *H04N 21/2187* (2013.01); *H04N 21/21805* (2013.01);
(Continued)

(58) Field of Classification Search
None
See application file for complete search history.

(56) References Cited

U.S. PATENT DOCUMENTS

2004/0261127 A1* 12/2004 Freeman ................ H04N 5/232
  725/135
2005/0193421 A1*  9/2005 Cragun .......................... 725/80
(Continued)

FOREIGN PATENT DOCUMENTS

CN  1427618 A  7/2003
CN  1760900 A  4/2006
(Continued)

OTHER PUBLICATIONS

International Search Report for corresponding International Application No. PCT/CN2011/081023 mailed Jan. 19, 2012.
(Continued)

*Primary Examiner* — Heather Jones
(74) *Attorney, Agent, or Firm* — Renner, Otto, Boisselle & Sklar LLP.

(57) ABSTRACT

Embodiments of present invention provide a method and system for collecting, transmitting, editing and integrating, broadcasting, and receiving signals. The method comprises acquiring one and/or more audio signals and one and/or more video signals or the one program collected by one and/or more audio and video collection terminals; editing and integrating the one and/or more audio signals and the one and/or more video signals or the one program on a network platform, and then broadcasting; selecting among the one and/or more audio signals and the one and/or more video signals for the one program at a receiving terminal, and receiving the selected audio signal and video signal.

14 Claims, 5 Drawing Sheets

(51) Int. Cl.
  *H04N 21/854* (2011.01)
  *H04N 21/218* (2011.01)
  *H04N 21/2187* (2011.01)
  *H04N 21/222* (2011.01)
  *H04N 21/258* (2011.01)
  *H04N 21/2665* (2011.01)

(52) U.S. Cl.
  CPC ..... *H04N 21/222* (2013.01); *H04N 21/25808* (2013.01); *H04N 21/25866* (2013.01); *H04N 21/2665* (2013.01)

(56) References Cited

U.S. PATENT DOCUMENTS

2007/0288986 A1* 12/2007 Candelore ............ H04N 7/1675
　　　　　　　　　　　　　　　　　　　　　　725/132
2012/0105629 A1* 5/2012 Colciago ............ H04L 12/2812
　　　　　　　　　　　　　　　　　　　　　　348/143

FOREIGN PATENT DOCUMENTS

| CN | 101291429 A | 10/2008 |
| CN | 201414171 Y | 2/2010 |
| CN | 101699868 A | 4/2010 |
| CN | 102075696 A | 5/2011 |
| WO | WO 2010/127418 A1 | 11/2010 |

OTHER PUBLICATIONS

1st Office Action received in the corresponding Chinese Application No. 201110002782.9 dated Feb. 29, 2012 and the English translation.

2nd Office Action received in the corresponding Chinese Application No. 201110002782.9 dated Aug. 31, 2012 and the English translation.

* cited by examiner

METHOD AND SYSTEM FOR COLLECTING, TRANSMITTING, EDITING AND INTEGRATING, BROADCASTING, AND RECEIVING SIGNAL

CROSS-REFERENCE TO RELATED APPLICATION

This application claims the right of priority of Chinese patent application No. 201110002782.9, filed to the Chinese Patent Office on Jan. 7, 2011, entitled "Method and System for Collecting, Transmitting, Editing and Integrating, Broadcasting, and Receiving Signal", which is hereby incorporated by reference in its entirety.

FIELD OF THE INVENTION

The present invention relates to the field of multimedia technology, and more particularly, to a method and a system for collecting, transmitting, editing and integrating, broadcasting, and receiving signals.

BACKGROUND OF THE INVENTION

Traditional television video and audio acquisition, production and broadcasting include nothing more than the following two patterns, namely a live broadcast pattern whereby signals are transmitted in real time, and a recorded broadcast pattern whereby signals are firstly produced and subsequently transmitted.

For the real-time live broadcast pattern, it is required to rent in advance such a transmission line as a microwave line, or a satellite line, or a fiber line. Due to factors such as restriction and cost of the transmission line, it is usual to firstly transfer respective signals from various cameras on the field into a mobile control room where the multiple signals are switched to/synthesized as a single program by a program director, and then transmit the single program via the transmission line to television stations as contents to be broadcasted. This puts great restrictions on the live broadcast director within a station during shot transitions. Although the transmission cost is reduced, the following deficiencies are inevitably engendered. Firstly, the materials for the program are greatly wasted and quality of programs is badly affected. Secondly, it is not only required to deploy the mobile control room but also required to equip therewith a large number of maintenance personnel, so the overall cost is still significant. Thirdly, with respect to the audience, it is only possible to watch the produced single program, thus losing the opportunity to personalize their own program. In order to avoid the deficiency of the aforementioned live broadcast pattern, it is usual for television stations to rent more transmission lines to provide directors within the stations with more materials. Although this enables more comprehensive reflection of the circumstances of the scenes and enhances the quality of programs, the increase in cost is a problem that could not be overlooked.

Network platforms of television stations (for example, China Network Television (CNTV)) serve to store programs, which have already been broadcasted at the stations, on the network platforms in a manner of whole or segment, so as to enable users to playback/view on demand these programs at any future time. However, in comparison with traditional television programs, the network platforms do not participate in the initial gathering and production of the programs. As can be seen from this, the network platform of a television station is merely a closed and secondary broadcasting medium of original television programs, and is characterized in its capability to allow the programs already produced to be played on various types of terminal devices.

In contrast, the IPTV (Internet Protocol Television) broadcast and control platform is an integrated broadcast and control platform of a television system for programs already broadcasted by different television stations, which is capable of integrating and broadcasting programs already produced by different television stations, so that audience at different locations can watch more programs. However, there is not much effect on and change in the production process of programs and watching behaviors of audience. Likewise, it is also a closed and secondary broadcasting medium.

Moreover, although the currently prevailing video network sites are diversified in terms of forms and channels for content acquisition, they are still directed to providing of already produced contents (such as movies and teleplays) and certain video contents as uploaded. There is no online live broadcast and interactive functions.

SUMMARY OF THE INVENTION

Embodiments of the present invention provide a network-platform based method and a system for collecting, transmitting, editing and integrating, broadcasting, and receiving one and/or more signals of multiple events/multiple programs, which are capable of providing one and/or more multi-perspective videos of a single event/program for users' selection, so as to achieve personalized watching effect.

On one hand, embodiments of the present invention provide a method for collecting, transmitting, editing and integrating, broadcasting, and receiving signals comprising acquiring one and/or more audio signals and one and/or more video signals for one program collected by one and/or more audio/video collecting terminals; editing and integrating the one and/or more audio signals and the one and/or more video signals for the one program on a network platform, and then broadcasting the signals; and selecting from the one and/or more audio signals and the one and/or more video signals for the one program at a receiving terminal, and receiving and presenting the selected audio signal and video signal.

On the other hand, embodiments of the present invention provide a system for collecting, transmitting, editing and integrating, broadcasting, and receiving signals comprising an audio/video acquiring unit configured to acquire one and/or more audio signals and one and/or more video signals for one program collected by one and/or more audio/video collecting terminals; a resource integrating and interacting unit configured to edit and integrate the one and/or more audio signals and the one and/or more video signals for the one program on a network platform, and then broadcast the signals; and a receiving unit configured to select from the one and/or more audio signals and the one and/or more video signals for the one program at a receiving terminal, and receiving and presenting the selected audio signal and video signal.

The aforementioned technical solutions possess the following advantageous effects. Due to the employment of the technical means of acquiring one and/or more audio signals and one and/or more video signals for one program collected by one and/or more audio/video collecting terminals, editing and integrating the one and/or more audio signals and the one and/or more video signals for the one program on a network platform, and then broadcasting the signals, and selecting from the one and/or more audio signals and the one and/or more video signals for the one program at a receiving terminal, and receiving and presenting the selected audio signal and video signal, it is possible to provide one and/or more multi-perspective videos for users' selection, so as to achieve personalized watching effect.

BRIEF DESCRIPTION OF THE DRAWINGS

In order to more clearly describe the technical solutions of the prior art or the embodiments of the present invention, the drawings to be used in the descriptions of the prior art or the embodiments are briefly introduced as follows. Obviously, the following drawings just illustrate some embodiments of the present invention, and a person skilled in the art can obtain other drawings from these drawings without paying a creative effort.

DETAILED DESCRIPTION OF THE INVENTION

The technical solutions in the embodiments of the present invention will be clearly and completely described below with reference to the accompanying drawings. Apparently, the embodiments described below are merely some of the possible embodiments of the present invention, rather than all of the possible embodiments. All other embodiments obtainable by persons ordinarily skilled in the art without creative effort based on the embodiments of the present invention shall all fall within the protection scope of the present invention.

Figure 1:
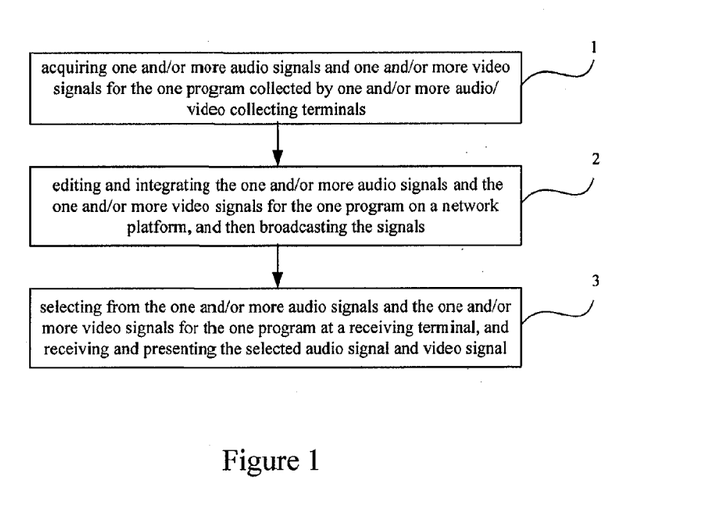
FIG. 1 is a flow chart illustrating a method for collecting, transmitting, editing and integrating, broadcasting, and receiving signals according to an embodiment of the present invention.

As shown in FIG. 1, which is a flow chart illustrating a method for collecting, transmitting, editing and integrating, broadcasting, and receiving signals according to an embodiment of the present invention, the method comprises the following steps:

1. Acquiring one and/or more audio signals and one and/or more video signals for one program collected by one and/or more audio/video collecting terminals.

Optionally, the step of acquiring one and/or more audio signals and one and/or more video signals for one program collected by one and/or more audio/video collecting terminals may further comprise collecting one and/or more audio signals and one and/or more video signals for one program by using one and/or more audio/video collecting terminals; registering the one and/or more audio/video collecting terminals; and acquiring one and/or more audio signals and one and/or more video signals for the one program collected by the registered one and/or more audio/video collecting terminals. The audio/video signals collected by unregistered audio/video collecting terminals can be taken as candidate signals. The method may further comprise transmitting, by each audio/video collecting terminal, the collected audio signals and video signals for the one program to the network platform for editing and integrating via a high-speed broadband transmission network through a high-speed broadband network communication module. The high-speed broadband transmission network includes one or more of the following networks: a television transmission network, a telecommunication transmission network, and an interconnection network that includes a 3G network or a 4G network. The above one and/or more audio signals may be heard at different positions of a scene. The above one and/or more video signals may be viewed at different perspectives of the scene.

2. Editing and integrating the one and/or more audio signals and the one and/or more video signals for the one program on a network platform, and then broadcasting the signals.

Optionally, said editing and integrating may comprise one or more of the following: registering the audio/video collecting terminals, inserting audio/video resources, censoring the audio/video resources, monitoring the audio/video resources, and billing the audio/video resources, wherein inserting audio/video resources is used to insert advertisements and/or accompanying sound. Said registering in this context is to confirm the identity of the possessor of the audio/video collecting terminal device, so as to time and bill the broadcast content. At the same time, the collected content of the possessor of the audio/video collecting terminal device is recorded in files and evaluated. With respect to an occasional collector, the content is firstly put in standby and subsequently registered. The timing and billing of any used content could not be performed without the step of registering of the audio/video collecting terminal device. The audio signals and video signals for the one program collected by each audio/video collecting terminal are recorded and filtered to acquire usable audio signals and video signals for the one program, and the signals are then broadcasted. The audio/video signals collected by unregistered audio/video collecting terminals are treated as candidate signals and are filtered, and the usable audio signals and video signals thereof are then broadcasted. Information about an audio signal and a video signal selected by the receiving terminal is acquired, and the audio signal and video signal selected by the receiving terminal are timed and billed.

3. Selecting from the one and/or more audio signals and the one and/or more video signals for the one program at a receiving terminal, and receiving and presenting the selected one audio signal and one video signal.

Figure 2:
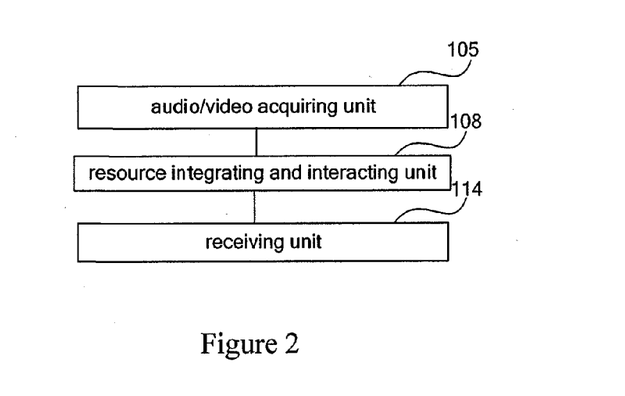
FIG. 2 is a schematic diagram illustrating the structure of a system for collecting, transmitting, editing and integrating, broadcasting, and receiving signals according to an embodiment of the present invention.

Corresponding to the aforementioned method embodiment, as shown in FIG. 2, which is a schematic diagram illustrating the structure of a system for collecting, transmitting, editing and integrating, broadcasting, and receiving signals according to an embodiment of the present invention, the system comprises the following components:

an audio/video acquiring unit 105 configured to acquire one and/or more audio signals and one and/or more video signals for the one program collected by one and/or more audio/video collecting terminals;

a resource integrating and interacting unit 108 configured to edit and integrate the one and/or more audio signals and the one and/or more video signals for the one program on a network platform, and then broadcasting the signals;

a receiving unit 114 configured to select from the one and/or more audio signals and the one and/or more video signals for the one program at a receiving terminal, and receiving and presenting the selected one audio signal and one video signal.

The receiving unit 114 further provides a choice for a plurality of receiving media, including a television set, a mobile television set, a computer, a mobile phone, and a smart terminal, etc. It can also take such broadcast platforms as an IPTV broadcast and control platform, a CNTV network platform etc. and video network sites as receiving media. Moreover, the broadcast and control systems of various local television stations can also be used as the receiving media.

Alternatively, the audio/video acquiring unit 105 is configured to collect the one and/or more audio signals and the one and/or more video signals for the one program by using one and/or more audio/video collecting terminals, and the resource integrating and interacting unit 108 is configured to register the one and/or more audio/video collecting terminals, and acquire one and/or more audio signals and one and/or more video signals for the one program collected by the registered one and/or more audio/video collecting terminals.

Alternatively, the audio/video acquiring unit 105 is further configured to transmit, by means of each audio/video collecting terminal, the collected one and/or more audio signals and one and/or more video signals for the one program to a network platform via a high-speed broadband transmission network through a high-speed broadband transmission module, so as to make edition and integration. The high-speed broadband transmission network includes one or more of the following networks: a television transmission network, a telecommunication transmission network, and an interconnection network that includes a 3G network or a 4G network.

Alternatively, the resource integrating and interacting unit 108 is specifically configured to edit and integrate one and/or more audio signals and one and/or more video signals for the one program, including one or more of the following: registering audio/video collecting terminals, inserting audio/video resources, censoring the audio/video resources, monitoring the audio/video resources, and billing the audio/video resources. Inserting audio/video resources is used to insert advertisements and/or accompanying sound.

Alternatively, the resource integrating and interacting unit 108 is further configured to filter the audio signals and video signals for the one program collected by each registered audio/video collecting terminal to acquire usable audio signals and video signals for the one program, and broadcast the acquired usable audio signals and video signals; treat the audio/video signals collected by unregistered audio/video collecting terminals as candidate signals and filter the candidate signals, and broadcast the usable audio signals and video signals thereof; and acquire information about an audio signal and a video signal selected by the receiving terminal, and time and bill the audio signal and video signal selected by the receiving terminal.

Figure 3:
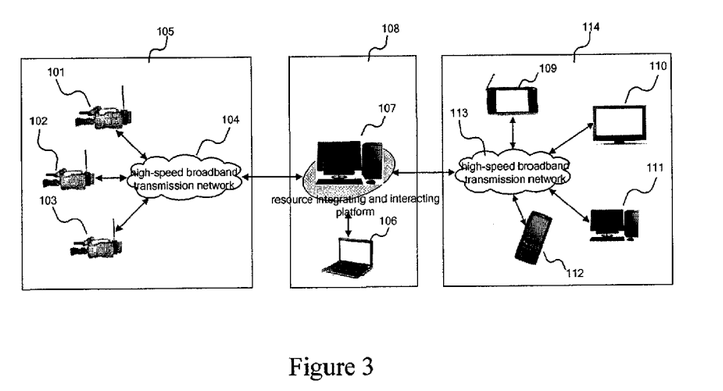
FIG. 3 is a schematic diagram illustrating the configuration of a network-platform based system for collecting, transmitting, editing and integrating, broadcasting, and receiving one and/or more signals according to an application example of the present invention.

As shown in FIG. 3, which is a schematic diagram illustrating the configuration of a network-platform based system for collecting, transmitting, editing and integrating, broadcasting, and receiving one and/or more signals according to an exemplary application of the present invention, the system comprises an audio/video acquiring unit 105, a resource integrating and interacting unit 108, and a receiving unit 114.

The audio/video acquiring unit 105 is constituted by a plurality of audio/video collecting terminals 101, 102, 103 and a high-speed broadband transmission network 104, and the operation flow thereof involves that the plurality of audio/video collecting terminals 101, 102, 103 transmit the acquired audio and video signals to a high-speed broadband transmission network 104.

Figure 4:
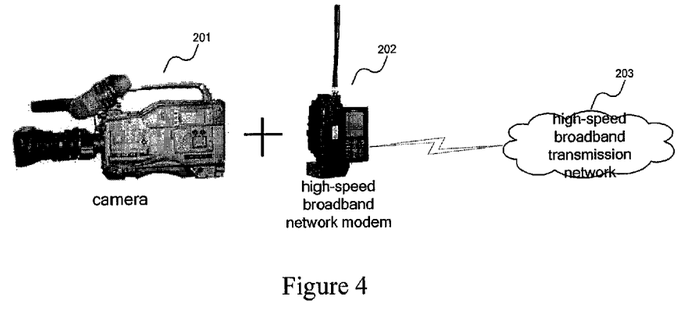
FIG. 4 is a schematic diagram illustrating the configuration of an audio/video collecting terminal according to an exemplary application of the present invention.

The audio/video collecting terminals 101, 102, 103 are innovative collecting terminals that are distinctive over currently available cameras, and are shown in FIG. 4, which is a schematic diagram illustrating the configuration of an audio/video collecting terminal according to an exemplary application of the present invention.

Figure 5:
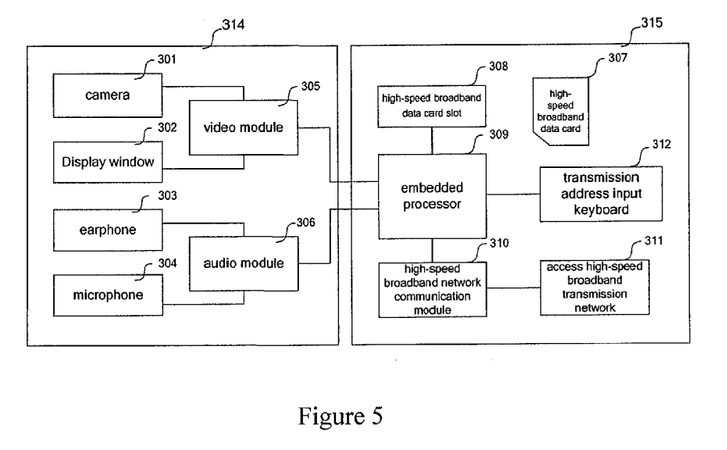
FIG. 5 is a schematic diagram illustrating the modules constituting an audio/video acquiring unit according to an exemplary application of the present invention.

Each of the audio/video collecting terminals consists of a currently available audio/video camera device 201 and a high-speed broadband network modem 202 (the modem is based on, but not limited to, the currently available high-speed broadband network communication standards, and it can be upgraded with the development of technologies and enhancement of standards). After connection of the high-speed broadband network modem 202 with the audio/video camera device 201, a completely novel audio/video collecting terminal is formed. The configuration and operation flow of the high-speed broadband network modem 202 are as shown in FIG. 5, which is a schematic diagram illustrating the configuration of an audio/video acquiring unit according to an exemplary application of the present invention.

The audio/video collecting terminal consists of a collecting unit 314 and a communicating unit 315.

The collecting unit 314 includes a camera 301, a display window 302, a video module 305, an earphone 303, a microphone 304 and an audio module 306.

The communicating unit 315 includes an embedded processor 309, a high-speed broadband data card 307, a high-speed broadband data card slot 308, a high-speed broadband communication module 310, a transmission address input keyboard 312 and an access high-speed broadband transmission network 311.

The operation flow is as follows:

A video signal acquired through the camera 301 and the display window 302 enters the video module 305, and an audio signal acquired by the earphone 303 and the microphone 304 enters the audio module 306. At the same time, the audio and video signals acquired by the video module 305 and the audio module 306 are delivered to the embedded processor 309 in the communicating unit 315; the processed signals are transmitted to the access high-speed broadband transmission network 311 according to the standard provided by the high-speed broadband network communication module 310 and an address inputted by the transmission address input keyboard 312. Inside the module, ID identification materials of the audio/video collecting terminal and the collector are simultaneously stored in the high-speed broadband data card 307, and an ID identification system of the terminal can be determined and formed by use in cooperation with the high-speed broadband data card slot 308, whereby the signal receiver can determine the IDs of the terminal and the operator based on the ID identification system.

Figure 6:
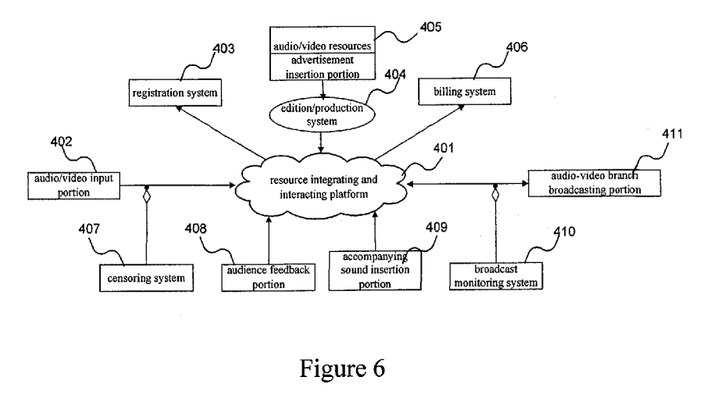
FIG. 6 is a schematic diagram illustrating the modules constituting a resource integrating and interacting unit according to an exemplary application of the present invention.

The resource integrating and interacting unit 108 in FIG. 3 consists of a resource integrating and interacting platform 107 and associated software 106. The resource integrating and interacting unit 108 receives audio/video signals sent from the audio/video acquiring unit 105, and broadcasts the signals to the receiving unit 114 after integrating. Refer to FIG. 6, which is a schematic diagram illustrating the resource included in the integrating and interacting unit according to an exemplary application of the present invention.

The resource integrating and interacting unit includes a resource integrating and interacting platform 401, an audio/video input portion 402, a registering system 403, edition/production system 404, advertisement insertion and audio/video resources portion 405, a billing system 406, a censoring system 407, audience feedback portion 408, accompanying sound insertion portion 409, a broadcast monitoring system 410, audio/video branch broadcasting portion 411 and so on. The operation flow is as follows.

When the audio/video input portion 402 brings forward a access request, the registering system 403 identifies and confirms the data in the high-speed broadband data card 307 with respect to the source from which the request comes; after confirmation, censoring is performed by the censoring system 407; if there is negative information, access will be denied; if there is no negative information, the resource integrating and interacting platform 401 grants a communication path to receive the information. At the same time, the billing system 406 is also turned on to register/meter/record information including, but not limited to, the source of the signal, the duration of the access, and the number of use, etc.

After the signal from the audio/video input portion 402 is received at the resource integrating and interacting platform 401, the signal is processed at the edition/production system 404, and the accompanying sound insertion portion 409 may be initiated on demand to attach the associated audio. Upon edition/production, the produced content is censored at the broadcast monitoring system 410 and then sent to the audio/video branch broadcasting portion 411 to be broadcasted to the receiving unit 114.

The edition/production system 404 includes the audio/video resources and advertisement insertion portion 405.

As shown in FIG. 3, the receiving unit 114 consists of a high-speed broadband transmission network 113 and various receiving terminals. The receiving terminal includes, but is not limited to, a mobile television set 109, a television set 110, a computer 111, a mobile phone 112, and so on. Signals broadcasted by the resource integrating and interacting unit 108 are sent to the various receiving terminals of the receiving unit 114 via the high-speed broadband transmission network 113.

Figure 7:
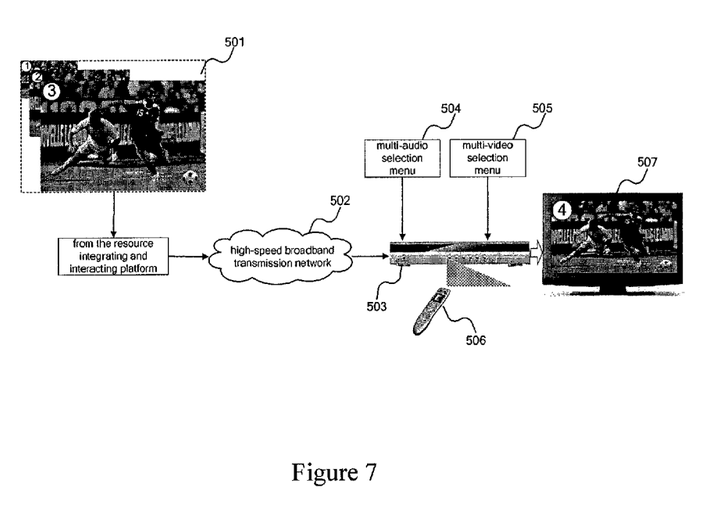
FIG. 7 is a schematic diagram illustrating the configuration of a receiving unit according to an exemplary application of the present invention.

As shown in FIG. 7, which is a schematic diagram illustrating the configuration of a receiving unit according to an exemplary application of the present invention, one and/or more audio and video signals 501 from the resource integrating and interacting platform 108 are sent to a receiving interface device 503 via a high-speed broadband transmission network 502. The receiving interface device 503 is equipped with, in addition to various functional selection menus provided thereto, one and/or more audios selection menu 504 and one and/or more videos selection menu 505. The receiving interface device 503 can be remotely operated by a remote controller 506. The receiving interface device 503 is connected with a display device 507, and the display device 507 displays received signals as well as results of the selection operations. The receiving interface device 503 and the display device 507 constitute the various receiving terminals.

The user of the receiving terminal may, on his own initiative, operate to randomly combine plural videos (namely multi-perspective pictures) and plural audios provided in one channel by the receiving terminal, and finally make selection and edition to achieve the real-time personalized receiving effect.

With the development of technologies and according to specific requirements, it is possible either to configure the receiving interface device 503 and the display device 507 such that the receiving interface device 503 and the display device 507 may be separate from each other or, coupled with each other. Alternatively, the receiving interface device 503 may be integrated into the display device 507. No matter how the receiving interface device 503 and the display device 507 are disposed, their interrelation is as shown in FIG. 8.

Figure 8:
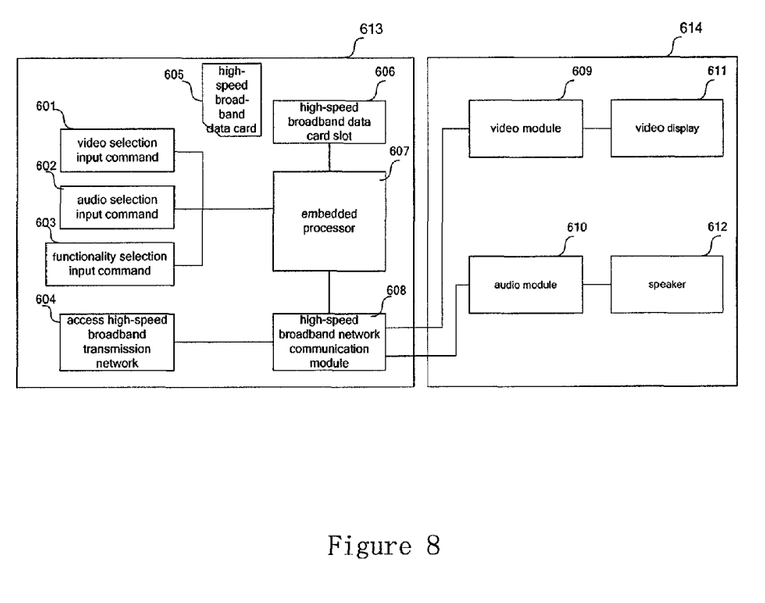
FIG. 8 is a schematic diagram illustrating the modules constituting the receiving unit according to an exemplary application of the present invention.

Refer to FIG. 8, which is a schematic diagram illustrating the modules constituting a receiving unit according to an exemplary application of the present invention. The receiving interface unit 613 includes a video selection input command 601, an audio selection input command 602, a functional selection input command 603, an access high-speed broadband transmission network 604, a high-speed broadband data card 605, a high-speed broadband data card slot 606, an embedded processor 607, and a high-speed broadband network module 608. The display unit 614 consists of a video module 609, an audio module 610, a video display 611 and a speaker 612.

The operation flow is as follows. The high-speed broadband data card 605 and the card slot 606 constitute an ID identification module of the receiving terminal. Video selection, audio selection and functional selection commands are inputted into the embedded processor 607 for selection via the video selection input command 601, the audio selection input command 602 and the functional selection input command 603. The selected audio and video results are displayed and broadcasted by the video display 611 and speaker 612 after passing through the video module 609 and the audio module 610.

For any television program that is completely broadcasted, there are no more than three processes including program signal acquisition, program production and program reception. In the mode that has been employed until the present days, what the audience can watch on the terminal device (the television set, as well as the MP4, the mobile television set and the mobile phone that have come in vogue only recently) is the (video/audio) program having experienced the production process. Accordingly, on one hand, from the perspective of the audience, it is difficult to obtain higher satisfaction from the watching experience of such passive reception, and, on the other hand, from the perspective of the program producer, it is objectively difficult to satisfy the personalization requirements of each person, no matter how rich the experience and advanced technology functions that an individual or a team may have.

For this reason, with the development of technologies, especially with the development of the concept of "Three-in-One Network", i.e., the integration of telecommunication, cable and Internet, the technical solution involved in the embodiments of the present invention is proposed. The purport to propose the present solution is to provide the audience with many more and wide-ranging services by means of the technologies and to achieve maximum satisfaction from personalized watching experience through proactive receiving selections.

Differences of the technical solution according to the present invention from the traditional mode are described below with exemplary applications respectively specifying the three aspects of program signal acquisition, program production and program reception.

The Process of Signal Acquisition

Two types of events, namely the live broadcast of a sport competition and the live report of an unexpected news event, are exemplified below to describe the functions, advantages and innovative concepts of the system according to the present invention.

① Live Broadcast of Sport Competition

The traditional live broadcast of a sport competition is as follows. Several cameras (either stationary or mobile) are disposed on the spot of the competition to reflect circumstances of the competition (i.e., the competition itself and the reaction of the audience) from different angles of view. The plural cameras simultaneously send a plurality of the acquired signals to a mobile control room on the spot either wiredly or wirelessly (by means of microwaves). If there is a commentator on the spot, the voice of the commentator is also synchronously transmitted to the mobile control room. A program director is dedicated to the spot; plural signals are formed into one signal by switching among the signals and, in turn, the formed one signal is integrated with the synchronous commentating audio so as to form one program; the program is transmitted back to the television station via fibers/microwaves/satellite channels, and then is processed by the studio personnel in the television station. If a commentator is located in the studio of the television station instead of being on the spot, it is required to synthesize the commentating audio with images to form the program to be finally broadcasted. A program formed as thus has the following two deficiencies.

(1) With respect to the producer, the cost of live broadcast of a sport competition is extremely high. Besides the personnel and equipment for photographing on the spot, it is also needed to equip with a mobile control room, program director and the relevant maintenance personnel. Although a rich variety of on-the-spot signals can be obtained, considering the problem of the cost spent on the transmission lines, it is usually possible only to process plural signals into one signal in the mobile control room and to transmit the one signal to the television station for standby broadcasting. Thus, many wonderful contents are unquestionably wasted.

(2) With respect to the audience, the audience can only passively watch and listen to the received content. Although there are several cameras to reflect the circumstances on the spot from different angles of view, the level of entertainment of the program merely depends on personal preferences and technique of the program director. When the completely synthesized program eventually reaches the audience, it will be difficult to satisfy the personalized requirements of each viewer.

With respect to the embodiments of the present invention, since the collecting terminal is provided with a wireless high-speed broadband access terminal on the basis of the conventional collecting terminal and the wireless high-speed broadband access terminal is capable of directly accessing to the high-speed broadband network, it becomes possible to directly send the acquired signals to the program producing platform (namely the resource integrating and interacting platform) within the range of coverage by the high-speed broadband network. Thus, not only can the large equipment such as the mobile control room and the relevant personnel be dispensed with and the cost is thus saved during the process of live broadcasting, the producing platform can also obtain much richer materials before broadcasting.

② Live Coverage of Unexpected News Event

Insofar as news media is concerned, in case of an unexpected news event, news media are always required to arrive at the spot most quickly, provide complete and vivid pictures of the spot most quickly, and provide comprehensive, objective and in-depth reports based on the above, so as to embody news track capacity of the medium. Under current conditions, such equipments as mobile control room (satellite vehicle) should be equipped therewith in order to report an event in a live-broadcasting style, but, due to restrictions of environments of the scene and the traffic, it is usual that the reporter can personally arrive but the vehicle and equipment could not arrive. Thus, the audience can only hear the description of the reporter from the spot about the scene in the program. Moreover, generally speaking, an unexpected news event will not last long (such as the case of a fire accident), so if it is only relied upon the reporter to arrive on the spot after he has got the clue, what the reporter can obtain may only be the results, as it is impossible to obtain first-hand materials of the process.

The system according to the present invention can avoid the occurrence of the aforementioned two limitations.

(1) Since the device is small in size and convenient for carriage, it is possible for the device to arrive at the place together with the reporter to acquire video and audio materials on the spot.

(2) Due to the development of technologies, with great popularization of relevant devices (such as digital cameras), non-media device possessors can capture unexpected events at any time and share with the public.

The Process of Program Production

Since the system according to the present invention differs from the convention in terms of program signal acquisition, and also significantly differs from the convention in terms of contents provided to the audience, it makes it different from the convention in terms of program production details. For example:

(1) ID registration and authentication must be performed on program content providers, and records and statistics must be carried out for the materials and time lengths provided by each content provider, as well as the selection of these contents by audience.

(2) It is normal in the convention to integrate already synthesized audio/video signals into one signal for audience to passively receive in one channel. However, it is now possible to send plural videos and plural audios to the same channel in divided branches for audience to actively select, thus achieving the real-time personalized watching effect.

The Process of Program Reception

The audience may actively select a video and an audio that may satisfy his own requirements from plural acquired video and audio materials to form a personalized receiving program on the receiving terminal.

For instance, when a certain channel provides a sport competition, it can provide not only a traditional, already synthesized, complete program, but also provide videos shot from four angles of A, B, C and D, and commentating voice of three different commentators, such as Mr. WANG, Mr. LI, Mr. ZHANG. As for the audience, they can either receive the complete program, or, when they find that the complete program cannot suit their tastes, they could freely select other perspectives or commentating voice to form a program that much satisfies his personal requirements.

In summary, embodiments of the present invention provide a cross-network, cross-media, novel, open, and interactive platform. The platform is different from the traditional television network, and also different from the currently prevailing pattern whereby television programs are merely played on telecommunication or internet platforms. The platform provides a completely novel watching pattern whereby more people can participate in the provision of materials and whereby audience can participate in the selection.

The system according to the present invention may consist of three parts, namely a method for acquiring video and audio signals, a method for transmitting and integrating/editing/managing video and audio signals, and a method for receiving/playing on video and audio signal receiving and playing terminals. However, the system according to the present invention is not merely restricted to the three parts, that is, any of the three parts of the system may be combined with the traditional mode to form a new system.

Design of the system according to the present invention avoids the aforementioned inevitable restrictions and deficiencies in the traditional flow by means of "openness". Firstly, with respect to acquisition of video and audio signals, the system can directly deliver video and audio signals from the camera device to the high-speed broadband network. Secondly, with respect to transmission, integration/edition/management of video and audio signals, all signals enter an open platform through the high-speed broadband network, and the accessed signals are integrated, edited and broadcasted on the platform. Thirdly, with respect to reception and playing back on video/audio signal receiving and playing terminals, the system can provide the users with more multi-perspective and multi-audio signals for the one program for free selection.

Therefore, it is not difficult to see that the system according to the present invention is characterized in the following aspects.

Firstly, with respect to acquisition of video and audio signals, mobile control rooms and studio directors on the spot, as the intermediate links, are dispensed with, whereby it is not only possible to greatly save the cost, but also possible to reduce the difficulties of arriving at the spot and acquiring signals with respect to the news program, so as to greatly enhance the timely report on unexpected events.

Secondly, the advantage of integrating, editing and broadcasting the delivered signals on an open platform is that it not only widely broadens the sources of video and audio signals, but also makes more effective use of the materials, to thereby correspondingly reduce the cost. Moreover, since the accessed high-speed broadband network is not limited to television network, but also includes high-speed internet, high-speed broadband wireless communication networks, or any type of a novel network having sufficient bandwidth and possessing the characteristic of high-speed to be formed with the incessant development of technologies, the platform has excellent universality and expandability, and can be accessed to more types of upgraded devices regardless of whether upstream or downstream.

Thirdly, with respect to audience of the terminal, programs provided by traditional television are not selectable. Moreover, the interactive television currently increasingly in vogue is merely a "library" pattern in which audiences are provided with a program menu and the audiences customize programs a la carte. In contrast, the system according to the present invention can provide the audience with plural multi-perspective and multi-audio signals for the one program, so that the audience can freely select the angles of view and the audios according to his preferences, so as to obtain more information and more richly personalized watching experiences. At the same time, the watching experiences and requirements can also be transmitted back to the open platform.

In summary, the system according to the present invention aims to create an open, multi-resources, multi-perspective, multi-audios, multi-network-transmissions, multi-types of reception media, video and audio servicing platform pattern, and anybody can serve as a provider of video and audio information and can also serve as a receiver and user of the contents.

Accordingly, the platform created by the system according to the present invention is a "transparent" network system as seen from the perspective of the users. The system not only reconfigures the video and audio signals, but also performs optimizing adjustment according to users' requirements, and eliminates collected and edited contents that have no audience rating, so as to make effective use of the acquired resources.

In addition, the widespread "openness" possessed by the system according to the present invention decides that the system is not only applied in the operating processes of such media as televisions and networks, but is applied with respect to particular fields and under particular environments, for instance, such various fields as monitoring and managements, accidents disposals, teleconferences/consultations of doctors/education, etc.

As should be particularly pointed out, embodiments of the present invention differ, as described below, from network platforms of television stations with China Network Television as a representative, IPTV broadcast and control platforms and the commonly existent video network sites.

Network platforms of television stations (for example, China Network Television (CNTV)) serve to store programs, which have already been broadcasted at the stations, on the network platforms in a manner of whole or segment, so as to enable users to playback/view on demand these programs at any future time. However, in comparison with traditional television programs, the network platforms do not participate in the initial gathering and production of the programs. As can be seen from this, the network platform of a television station is merely a closed and secondary broadcasting medium of original television programs, and is characterized in its capability to broadcast programs already produced on various types of terminal devices.

In contrast, the IPTV (Internet Protocol Television) broadcast and control platform is an integrated broadcast and control platform of a television system for programs already broadcasted by different television stations, and is capable of integrating and broadcasting programs already produced by various different television stations, so that audience at different regions can view more programs. However, there is not much effect on and change in the production process of programs and the watching behaviors of receivers. Likewise, it is also a closed and secondary broadcasting medium.

Moreover, although the currently prevailing video network sites are diversified in terms of forms and channels for content acquisition, they are still directed to broadcasting of already produced contents (such as movies and teleplays) and certain video contents as uploaded. There is a deficiency in online live broadcasting and interactive functionality.

In contrast, embodiments of the present invention is directed to a method whereby the acquired video and audio signals are transmitted by means of a high-speed broadband communication network to a destination where the signals are required, and/or to a video/audio receiving device created by the destination. The method enables a video recording device, under support of a high-speed public communication network and a novel television device, to send video and audio digital signals directly to targets desired by the video recorder, such as different television stations, telecommunication or internet network sites, or personal mailboxes or storage spaces established at the network sites, and to transmit the video and audio signals via these media to the receiving device terminal. The receiving device can operate and play different videos and audios under operations of the audience, so as to achieve the real effects of responding to and directly broadcasting the signals. At the same time, the platform can also record or time the different videos and audios it receives online, and take this as the basis to pay for the video/audio recorder. Seen as such, video and audio signals acquired by an open video/audio acquiring terminal are transmitted to a video/audio receiving terminal through such various transmission networks as, but not limited to, the "three-in-one network" (namely the television transmission network, the telecommunication transmission network, and the Internet), are received by the audience in such a manner that the same program is received according to different angles and requirements of view, and are charged according to requirements thereafter. Thus, the system according to the present invention forms a completely open platform.

As comprehensible to persons ordinarily skilled in the art, the entire or some steps in the aforementioned method embodiment can be realized through a program that instructs relevant hardware, and the program can be stored in a computer-readable storage medium, and, when executed, includes the entire or some steps. The storage medium may be an ROM, an RAM, a magnetic disk, an optical disk, etc.

The aforementioned specific embodiments make further and detailed explanations of the objectives, technical solutions and advantageous effects of the present invention. As should be understood, the above is merely directed to the specific embodiments of the present invention, and is not meant to restrict the protection scope of the present invention, as any modification, equivalent substitution and improvement makeable within the spirits and principles of the present invention shall all fall within the protection scope of the present invention.

What is claimed is:

1. A method for collecting, transmitting, editing and integrating, broadcasting, and receiving signals, comprising:
   collecting multiple audio signals and multiple video signals, or one audio signal and multiple video signals, or multiple audio signals and one video signal for the one program by using multiple audio and video collecting terminals;
   registering the multiple audio and video collecting terminals, said registering is to confirm identity of one or more possessors of the multiple audio and video collecting terminals, wherein the identity of the one or more possessors is used so as to time and bill broadcast contents such that the one or more possessors are paid for the collecting;
   acquiring the multiple audio signals and the multiple video signals, or the one audio signal and the multiple video signals, or the multiple audio signals and the one video signal for the one program collected by the registered multiple audio and video collecting terminals on a network platform separating from the multiple audio and video collecting terminals; and treating the audio and video signals collected by unregistered audio and video collecting terminals as candidate signals;
   editing and integrating the multiple audio signals and the multiple video signals, or the one audio signal and the multiple video signals, or the multiple audio signals and the one video signal for the one program on the network platform, and then broadcasting to a receiving terminal separating from the multiple audio and video collecting terminals and the network platform the edited and integrated multiple signals; and
   selecting from the received multiple audio signals and multiple video signals, or the received one audio signal and multiple video signals, or the received multiple audio signals and one video signal for the one program at the receiving terminal, and presenting the selected audio signal and video signal.

2. The method according to claim 1, further comprising: transmitting, by each audio and video collecting terminal, the collected audio signals and video signals for the one program to the network platform for editing and integrating via a high-speed broadband transmission network by using a high-speed broadband network communication module, wherein the high-speed broadband transmission network includes one or more of a television transmission network, a telecommunication transmission network, and an interconnection network that includes a 3G network or a 4G network.

3. The method according to claim 1, wherein the editing and integrating comprises one or more of registering the audio and video collecting terminals, inserting audio and video resources, censoring the audio and video resources, monitoring the audio and video resources, and billing the audio and video resources, wherein inserting audio and video resources is used to insert advertisements and/or accompanying sound.

4. The method according to claim 3, wherein the editing and integrating the multiple audio signals and the multiple video signals, or the one audio signal and the multiple video signals, or the multiple audio signals and the one video signal for the one program at the network platform and then broadcasting to the receiving terminal separating from the multiple audio and video collecting terminals and the network platform the edited and integrated multiple signals comprises:
   acquiring usable audio signals and video signals for the one program by filtering the audio signals and video signals for the one program collected by each registered audio and video collecting terminal and filtering the audio and video signals collected by the unregistered audio and video collecting terminals and taken as the candidate signals;
   broadcasting to the receiving terminal the usable audio signals and video signals;
   acquiring information about the selected audio signal and video signal at the receiving terminal, and timing and billing the selected audio signal and video signal.

5. The method according to claim 1, wherein the edited and integrated multiple signals comprise plural video signals and plural audio signals for the one program.

6. The method according to claim 5, wherein the edited and integrated multiple signals are broadcasted to the receiving terminal in one channel; and
   the selecting from the received multiple audio signals and multiple video signals, or the received one audio signal and multiple video signals, or the received multiple audio signals and one video signal for the one program at the receiving terminal is performed by selecting, at the receiving terminal, from the multiple audio signals and the multiple video signals, or the one audio signal and the multiple video signals, or the multiple audio signals and the one video signal broadcasted in said one channel for the one program.

7. The method according to claim 1, wherein the multiple video signals are multi-perspective pictures.

8. A system for collecting, transmitting, editing and integrating, broadcasting, and receiving signals, comprising:
an audio and video acquiring unit configured to collect multiple audio signals and multiple video signals, or one audio signal and multiple video signals, or multiple audio signals and one video signal for the one program by using multiple audio and video collecting terminals, and acquire the multiple audio signals and the multiple video signals, or the one audio signal and the multiple video signals, or the multiple audio signals and the one video signal for the one program collected by the multiple audio and video collecting terminals on a network platform;
a resource integrating and interacting unit configured to register the audio and video collecting terminals, said register is to confirm identity of one or more possessors of the multiple audio and video collecting terminals, wherein the identity of the one or more possessors is used so as to time and bill broadcast contents such that the one or more possessors are paid for the collecting, acquire the multiple audio signals and the multiple video signals, or the one audio signal and the multiple video signals, or the multiple audio signals and the one video signal for the one program collected by the registered multiple audio and video collecting terminals on a network platform separating from the multiple audio and video collecting terminals and, treat the audio and video signals collected by unregistered audio and video collecting terminals as candidate signals, and edit and integrate the multiple audio signals and the multiple video signals, or the one audio signal and the multiple video signals, or the multiple audio signals and the one video signal for the one program on the network platform, and then broadcast to a receiving terminal separating from the multiple audio and video collecting terminals and the network platform and the edited and integrated multiple signals; and
a receiving unit configured to select from the received multiple audio signals and multiple video signals, or the received one audio signal and multiple video signals, or the received multiple audio signals and one video signal for the one program at the receiving terminal, and present the selected audio signal and video signal.

9. The system according to claim 8, wherein the audio and video acquiring unit is further configured to transmit the collected multiple audio signals and multiple video signals, or the collected one audio signal and multiple video signals, or the collected multiple audio signals and one video signal for the one program to the network platform for editing and integrating by using a high-speed broadband network communication module of each audio/video collecting terminal via a high-speed broadband transmission network, wherein the high-speed broadband transmission network includes one or more of a television transmission network, a telecommunication transmission network, and an interconnection network that includes a 3G network or a 4G network.

10. The system according to claim 8, wherein the resource integrating and interacting unit is specifically configured to edit and integrate the multiple audio signals and the multiple video signals, or the one audio signal and the multiple video signals, or the multiple audio signals and the one video signal for the one program, said editing and integrating comprises one or more of registering the audio and video collecting terminals, inserting audio and video resources, censoring the audio and video resources, monitoring the audio and video resources, and billing the audio and video resources, wherein inserting audio/video resources is used to inserts advertisements and/or accompanying sound.

11. The system according to claim 8, wherein the resource integrating and interacting unit is further configured to acquire usable audio signals and video signals for the one program by filtering the audio signals and video signals for the one program collected by each registered audio and video collecting terminal and filtering the audio and video signals collected by the unregistered audio and video collecting terminals and taken as the candidate signals, and broadcast the usable audio signals and video signals to the receiving terminal, acquire information about the selected audio signal and video signal at the receiving terminal, and time and bill the selected audio signal and video signal.

12. The system according to claim 8, wherein the edited and integrated multiple signals comprise plural video signals and plural audio signals for the one program.

13. The system according to claim 12, wherein the resource integrating and interacting unit is further configured to broadcast to the receiving terminal the edited and integrated multiple signals in one channel; and
the receiving unit is further configured to select, at the receiving terminal, from the multiple audio signals and the multiple video signals, or the one audio signal and the multiple video signals, or the multiple audio signals and the one video signal broadcasted in said one channel for the one program.

14. The system according to claim 8, wherein the multiple video signals are multi-perspective pictures.

* * * * *